United States Patent
Gestrelius et al.

(10) Patent No.: US 7,640,266 B2
(45) Date of Patent: Dec. 29, 2009

(54) COMPUTER PROGRAM PRODUCT AND ASSOCIATED METHODS FOR SEARCHING A DATABASE OF OBJECTS, CONNECTING OBJECTS IN SUCH A DATABASE, AND EXPORTING DATA FROM AT LEAST ONE ARBITRARY DATABASE

(75) Inventors: Staffan Gestrelius, Hjärup (SE); Gil Roitto, Malmö (SE)

(73) Assignee: Sixsteps AB, Lund (SE)

( * ) Notice: Subject to any disclaimer, the term of this patent is extended or adjusted under 35 U.S.C. 154(b) by 706 days.

(21) Appl. No.: 10/526,393

(22) PCT Filed: Sep. 1, 2003

(86) PCT No.: PCT/SE03/01344

§ 371 (c)(1),
(2), (4) Date: Mar. 2, 2005

(87) PCT Pub. No.: WO2004/023343

PCT Pub. Date: Mar. 18, 2004

(65) Prior Publication Data

US 2006/0053128 A1    Mar. 9, 2006

(30) Foreign Application Priority Data

Sep. 3, 2002    (SE)    ................................. 0202593

(51) Int. Cl.
*G06F 7/00*    (2006.01)
*G06F 17/00*    (2006.01)
*G06F 17/30*    (2006.01)
(52) U.S. Cl. ...................... 707/103 Y; 707/3
(58) Field of Classification Search .............. None
See application file for complete search history.

(56) References Cited

U.S. PATENT DOCUMENTS 5,721,911 A     2/1998   Ha et al.
6,044,217 A *   3/2000   Brealey et al. ............... 717/107
2002/0194151 A1 12/2002  Fenton et al.

FOREIGN PATENT DOCUMENTS

EP    1 213 667 A2    6/2002

(Continued)

OTHER PUBLICATIONS

Shanmugasundaram et al., "Relational Databases for Querying XML Documents: Limitations and Opportunities", Proc. Of the 25th VLDB Conference, Morgan Kaufmann, 1999.*

(Continued)

*Primary Examiner*—Neveen Abel Jalil
*Assistant Examiner*—Michael J Hicks
(74) *Attorney, Agent, or Firm*—Birch, Stewart, Kolasch & Birch, LLP

(57) ABSTRACT

A computer program product has program code adapted to provide, upon execution, a database of objects and a database engine for managing the objects. Each object comprises metadata for describing the object and for defining a hierarchical structure of branches which constitutes the object and which includes relations to other objects. An individual branch has a metadata type, which is selected from a predetermined and limited set of n different metadata types and which represents one respective hierarchical level in the hierarchical structure, and a metadata value. An individual branch may also have an arbitrary number of other branches, of any hierarchical level strictly subordinate to the hierarchical level of the individual branch, connected to the individual branch as children thereof. The arbitrary number may include zero branches.

17 Claims, 10 Drawing Sheets

FOREIGN PATENT DOCUMENTS

| | | |
|---|---|---|
| EP | 1 244 030 A1 | 9/2002 |
| GB | 2 329 044 A | 3/1999 |
| GB | 2 355 818 A | 5/2001 |

OTHER PUBLICATIONS

Bohlen et al., "Point-versus interval-based temporal data models", Proceedings of the 14th International Conference on Data Engineering, pp. 192-200, 1998, IEEE.*

Damiani et al., "ACM Transactions on Information and System Security", vol. 5, No. 2, pp. 169-202, May 2002, ACM.*

Weiner et al., Metadata tables to enable dynamic data modeling and web interface design: the SEER example, International Journal of Medical Informatics, vol. 65, Issue 1, Apr. 2002, pp. 51-58, Elsevier Science Ireland Ltd.*

* cited by examiner

COMPUTER PROGRAM PRODUCT AND ASSOCIATED METHODS FOR SEARCHING A DATABASE OF OBJECTS, CONNECTING OBJECTS IN SUCH A DATABASE, AND EXPORTING DATA FROM AT LEAST ONE ARBITRARY DATABASE

TECHNICAL FIELD

The present invention generally relates to the field of finding, connecting and browsing any number of independent information objects that may or may not refer to each other by means of any type of attribute or value, as long as every information object consists of at least one data element attribute and one data element value. More particularly, the invention relates to a computer program product and associated methods of searching a database of objects, connecting objects in such a database, and exporting data from at least one arbitrary database.

BACKGROUND OF THE INVENTION

Most knowledge producing organizations have a project oriented value chain that utilizes the expertise of different line functions to contribute to the end result. Since the expert line functions are using different information systems to efficiently carry out their tasks, there is a need for an information system that can integrate and preserve the obtained digital information in a flexible and easy way. The need is both to preserve data for extended time periods, and to be able to easily re-use them in new constellations. This problem is a reality in most cumulative knowledge building activities ranging from the academic world to commercial pharmaceutical research. However, it is also an identified problem in modern healthcare, where vital patient information may come from many different laboratory or hospital systems, but still need to be stored, integrated and re-used for a lifetime.

Current technologies for addressing these problems are based on relational databases or object oriented databases. These technologies have proved very efficient in creating systems for data transaction and reporting. However, they are not designed for long time storage and an open integration between different systems, and they are not easily altered to accommodate new types of data. Although object-oriented databases handle objects, they are not suitable for integration of different types of objects in a distributed environment. The reason for this is that in an object-oriented database fixed classes have to be defined, and all data has to fit into the structure of those classes. Searching is difficult since the user needs to know in which class and in which attribute data should be searched for. Relations between objects are "fixed links" which must be known a priori.

Hence, neither of these technologies is suitable for obtaining the ease of integration between distributed databases that is the demand. There is clearly a need to improve the situation by suggesting technologies that are more focused on keeping and integrating individual knowledge elements into accumulated knowledge.

SUMMARY OF THE INVENTION

Accordingly, an objective of the present invention is to mitigate the above-mentioned shortcomings and to provide a new method for retrieval and integration of any number of independent information objects, that may be stored in a standardized future-proof text format and that may refer to each other by means of any type of attribute or value.

This objective is achieved by a computer program product and methods having the features recited in the attached independent claims. Preferred embodiments of the invention are recited in the dependent claims.

Thus, a first aspect of the invention is a computer program product having program code adapted to provide, upon execution, a database of objects and a database engine for managing said objects, where:

each object comprises metadata for describing the object and for defining a hierarchical structure of branches which constitutes said object and which includes relations to other objects, wherein an individual branch has:

a metadata type, which is selected from a predetermined and limited set of n different metadata types and which represents one respective hierarchical level in said hierarchical structure;

a metadata value; and an arbitrary number of other branches, of any hierarchical level strictly subordinate to the hierarchical level of said individual branch, connected to said individual branch as children thereof, said arbitrary number including zero branches.

This novel and unique hierarchical structure of branches of different, well-defined metadata types within each object provides an efficient and general way of describing, handling and searching among independent information objects, potentially originating from differents information sources or systems, and also describing relations between such objects. Moreover, it also allows for standardized and future-proof long-time storage of such information objects.

A second aspect of the invention is a method of searching a database of objects as provided by the computer program product according to the first aspect. The method involves the steps of specifying, through a man-machine interface of a computer, a search query in a declarative language in accordance with said hierarchical structure of objects in said database;

submitting said search query to said database engine through said computer;

receiving a result of said search query at said computer; and presenting said result through said man-machine interface.

A third aspect of the invention is a method of exporting data from at least one arbitrary database. The method involves the steps of identifying a first plurality of relations between different pieces of data in said at least one database;

defining a second plurality of objects, each of said objects comprising metadata which represents individual ones of said first plurality of relations and said different pieces of data, said metadata being of n different metadata types, n being a predetermined integer;

for each object, forming an n-level hierarchical information structure, where each metadata type is represented at a respective unique level; and storing the information structures thus formed for said second plurality of objects.

A fourth aspect of the invention is a method of connecting objects in a database of objects as provided by the computer program product according to the first aspect. The method involves the steps, for an assumed individual object, of:

for all branches in the assumed object that are of a first predetermined metadata type, said first predetermined metadata type allowing a relation to be defined from the assumed object to another object:

forming a query based on the metadata of the branch, searching the database with the query, and collecting, as a result of the searching step, all objects, if any, that the assumed object has a relation to; and for all branches in the assumed object that are of a second predetermined metadata type, other than said first predetermined metadata type, said second predetermined metadata type allowing a reverse relation to be defined from another object to the assumed object:

forming a query based on the metadata of the branch, searching the database with the query, and collecting, as a result of the searching step, all objects, if any, that have a relation to the assumed object.

According to the present invention any type of tabular or text database can be transformed into one or many specific generic information structures expressed in a future-proof text format like e.g. xml. These information structures can be contained in one or many flat files that may be stored on a magnetic disk, an optical disk, a magnetooptical disk or an electronic semiconductor memory for extended times.

The text-based information structures can be automatically indexed and put into a strictly hierarchical n-field structure that may reside on secondary memory, but still be easily and rapidly queried by a simple query syntax. This client-server architecture also makes it possible to incrementally update the database online.

The minimal n-field structure can be indexed by means of reverse indices for all fields, which makes it possible to perform exhaustive searches of the database from a single field without any prior knowledge about the database structure or content. The search can be specified as regards attribute, type and value and allows for full Boolean logic as well as "starts with" or "fuzzy logic". These search facilities, together with the strict hierarchical nature of the database structure, makes it possible to easily find any specific data or group of data in the database.

Preferably, the hierarchical n-field structure has 5-7 fields, i.e. 5<=n<=7. Even more preferably, n=6.

After finding the desired information elements, their relations with each other may appear as named links from the respective elements. By selecting such a link all objects using this link will be selected. It is in this way easy to navigate around in the network of relations that connect the different related information objects. Any object can at any time be chosen as the "root" or "perspective" from which all the other objects are seen and can be reached. An important feature in this context is the usage of reversed link technology. This makes it possible to show a relation from an object A to another object B, although the actual relation is only given in object B.

In contrast to prior art database technologies where relations between objects are "fixed links", such relations may be found on the fly according to the the present invention.

Besides the functionality of finding and navigating in the database, the new technology also permits the use of attributes on objects, links, and metadata. This opens up the possibility to introduce an explicit time dimension in the database. Hence, objects and relations can be initiated or updated without losing the audit trail by simply setting an end date on previous values and/or relations. In subsequent searches and navigations a filter can be used for obtaining only the values that are or were valid at any specific point in time. This greatly facilitates the monitoring of sequences of time-based events that is necessary for tracking audit trails, organizational changes, validity of standard operating procedures etc.

Another functionality unique to the proposed technology is the use of predefined associations. Associations are described by a hierarchy of directed paths between object types and are automatically processed in the search algorithm. Any number of associations can be defined and applied. This feature can be used within any given local database or group of databases and will improve the speed of search within that local database or group of databases without hampering the total flexibility of the distributed nature of the invention. It is in this way possible to rapidly integrate and recreate large databases.

Generally, all terms used in the claims are to be interpreted according to their ordinary meaning in the technical field, unless explicitly defined otherwise herein. All references to "a/an/the [element, means, component, member, unit, step etc.]" are to be interpreted openly as referring to at least one instance of said element, means, component, member, unit, step etc. The steps of the methods described herein do not have to be performed in the exact order disclosed, unless explicitly specified.

BRIEF DESCRIPTION OF THE DRAWINGS

One embodiment of the present invention will now be described by way of examples, reference being made to the accompanying drawings, in which.

DETAILED DESCRIPTION OF THE INVENTION

Objects

Figure 1:
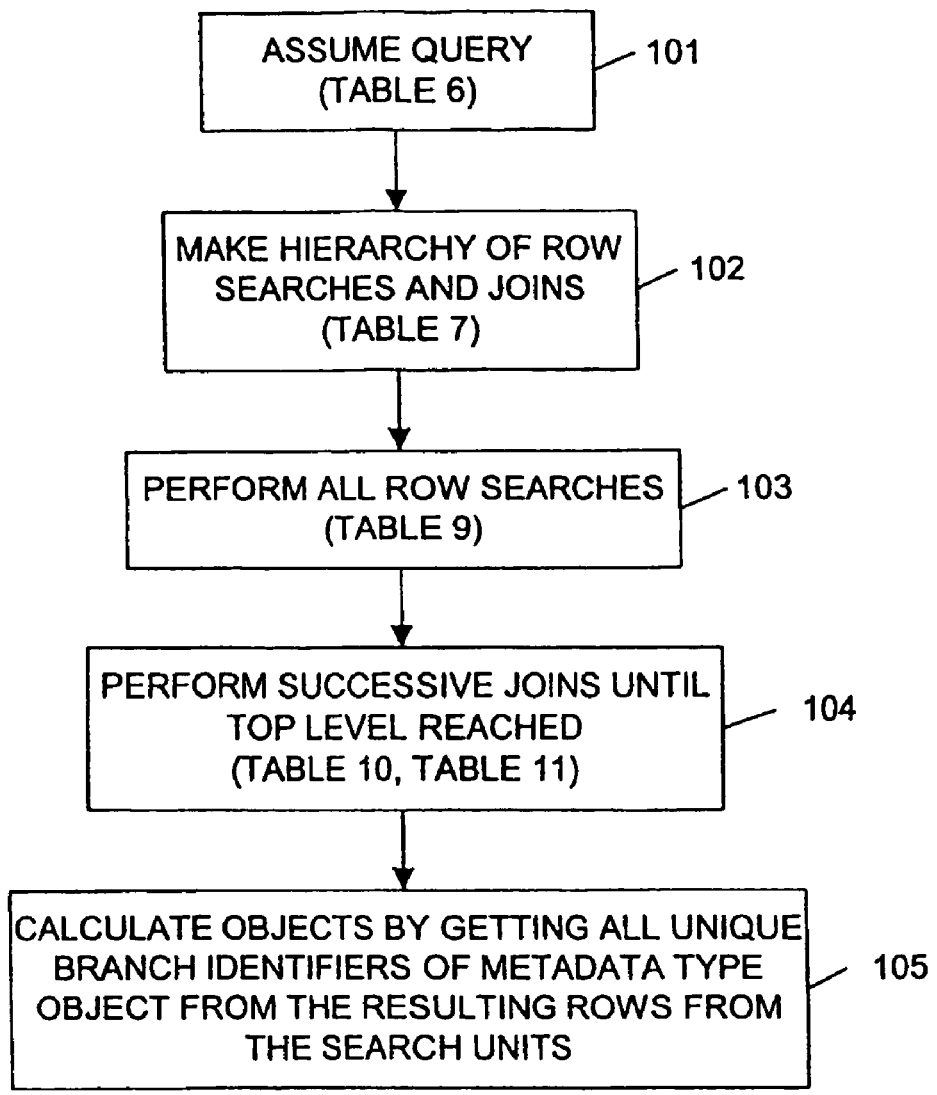
FIG. 1 is a diagram providing a general overview of the search algorithm according to the invention.

The fundamental unit of processing in the present invention is an object. An object has metadata connected to it. Metadata is data describing the object. An object consists of several branches connected to each other in a hierarchical or tree-like fashion. A branch can have any number of other branches connected to it, also called the children of the branch. A branch is of a certain metadata type: o (object); r (relation); k (key); a (attribute) [or, synonymously, g (group)]; t (type) [or, synonymously, f (field)]; or v (value). A branch also has a metadata value.

Any model in a relational database can be broken down into a system of the objects processed by the present invention, where one or many objects will represent the rows and columns in the tables of the relational database. The relations or references between different data in a database can be described as metadata in objects and even named. In most cases the database model can be clarified by naming the relations.

Object Structure

The structure of the object is a strict hierarchy of the six different metadata types given above. Since the metadata types are hierarchically arranged, where every metadata type is represented at a certain level, they are also referred to as levels (hierarchical levels) in the text below. These metadata types are the only ones allowed. However any number of branches of the same metadata type is allowed and a branch can have any number of children. Any number of intermediate levels can be skipped but has to be in the correct order. It is a very flexible format with only two restrictions: 1) the root branch must always be o, and there can only be one branch of that metadata type. 2) The tags, that is the metadata types, must always lie in the described order.

Since the objects consist of a strict hierarchy, it is very well expressed in a declarative language such as xml, which is based on the ISO standard SGML. See Table 1 below.

TABLE 1

Object structure.

```
<o>
    <r>
        <k>
            <a>
                <t>
                    <v>
                    </v>
                </t>
            </a>
        </k>
    </r>
</o>
```

Other declarative languuages that can be used to express the object hierarchy include SGML dialects, hierarchially connected objects in a programming language, a graphically modelled hierarchy, etc.

The object structure can be described by a context-free grammar defined in the Chomsky hierarchy of formal languages, as seen in Table 2:

TABLE 2

Context-free grammar of the object structure.

| Object     | → | <o> Relations </o>                  |
|------------|---|-------------------------------------|
| Relations  | → | Keys \| <r> String Keys </r> Relations |
| Keys       | → | Attributes \| <k> String Attributes </k> Keys |
| Attributes | → | Types \| <a> String Types </a> Attributes |
| Types      | → | Values \| <t> String Values </t> Types |
| Values     | → | ε \| <v> String </v> Values         |
| String     | → | ε \| Character String               |
| Character  | → | \u0001 \| . . . \| \uFFFF           |

All metadata values in the examples are assumed to be expressed in Unicode strings. A simple example of an object described in xml is given in Table 3:

TABLE 3

Simple object example.

```
<o>Adam
    <r>wife
        <a>person
            <t>person id
                <v>500101-2221
```

TABLE 3-continued

Simple object example.

```
                </v>
            </t>
        </a>
    </r>
    <a>person
        <t>person id
            <v>480101-1111
            </v>
        </t>
        <t>name
            <v>Adam
            </v>
        </t>
    </a>
</o>
```

By expressing the objects in xml, all the contents of a database can been moved to a future-proof format that can be stored on e.g. CD-disks, while still being actively queried and used by the present invention.

By using the objects described, all data from any database can be transformed into a simple six-field structure. In addition the type of content of the different fields is always the same. This makes it possible to search for any specific content, regardless of the initial complexity in the same manner. All regular database entries can be put in the v-field, and all relations in the r-field etc. Table 4 below gives a simple example of a transformation from the object in Table 3 to a branch table, which is shown in Table 5.

TABLE 4

Simple example used for illustrating the transformation from an object to the branch table. The comments give the unique branch identifier.

| <o>Adam           | //0 |
| <r>wife           | //0 |
| <a>person         | //0 |
| <t>person id      | //0 |
| <v>500101-2221    | //0 |
| </v>              |     |
| </t>              |     |
| </a>              |     |
| </r>              |     |
| <a>person         | //1 |
| <t>person id      | //1 |
| <v>480101-1111    | //1 |
| </v>              |     |
| </t>              |     |
| <t>name           | //2 |
| <v>Adam           | //2 |
| </v>              |     |
| </t>              |     |
| </a>              |     |
| </o>              |     |

TABLE 5

The branch table created from the data in Table 4.

| o | r | k | a | t | v |
|---|---|---|---|---|---|
| 0 [Adam] | 0 [wife] | — | 0 [person] | 0 [person id] | 0 [500101-2221] |
| 0 [Adam] | — | — | 1 [person] | 1 [person id] | 1 [480101-1111] |
| 0 [Adam] | — | — | 1 [person] | 2 [name] | 2 [Adam] |

Internal Format of Metadata

In the present invention all objects are stored internally in the same structure as described above. A unique branch identifier represents each branch. Since all branches have a metadata type, it needs only to be unique within the metadata type. Each branch identifier has an associated value, which is the metadata value for that branch. All unique values are in the same way represented by a unique value identifier. More than one branch identifier can have the same value.

Internal Structure Format

All objects, including all the metadata, are also internally stored in a structure, called the branch table. The branch table has the same columns as the different metadata types. In the cells of the table, branch identifiers are stored. Objects are transformed into the branch table by letting every end branch in the objects result in a row in the table. An end branch is a branch that has no children. Each row contains all the branches that preceds the end branch as its parents, and the columns in the row contain the branch identifiers for the branches (see Table 4 and 5).

Indexing

In order to be able to quickly search for metadata values in the objects, each column in the branch table is indexed. The kind of indices that is applied to the columns can be any kind of indices used in databases, which allows searches like "begins with" or "fuzzy". Keys in the indices are the values of the branches and results of searches are the rows in the branch table. It might be the entire rows or just the row numbers. In the latter case the actual rows can be fetched later from where it is stored.

Search Algorithm

When a search is performed, only the table, its indices and the values of the branches are needed. A search query has the same structure as an object except that the root branch is not an object but rather a connecting "query" branch that connects all the separate search conditions in the query (see example query described in xml in Table 6 below). The search is a search for parts of an object. An object is considered found if it includes all the searched parts.

TABLE 6

Example of query in xml format.

```
<query>
    <a>person
        <t>person id
            <v>480101-1111
            </v>
        </t>
        <t>name
            <v>Adam
            </v>
        </t>
    </a>
    <r>wife
    </r>
</query>
```

A search is performed in a number of steps. An overview of the search algorithm is given in FIG. 1. A given query (step 101) is transformed into a hierarchy of so called row searches and joins (step 102). The row searches and joins are called search units and a hierarchy of search units is called a search hierarchy. In a next step all the row searches are done, which result in a number of rows in the branch table (step 103). These results are then joined successively until the top level of the search hierarchy is reached (step 104). The row searches and joins will be described in more detail in the following text. The last step of the search algorithm is to calculate the resulting objects of the search by getting all the unique objects from the resulting rows from the search units.

Figure 2:
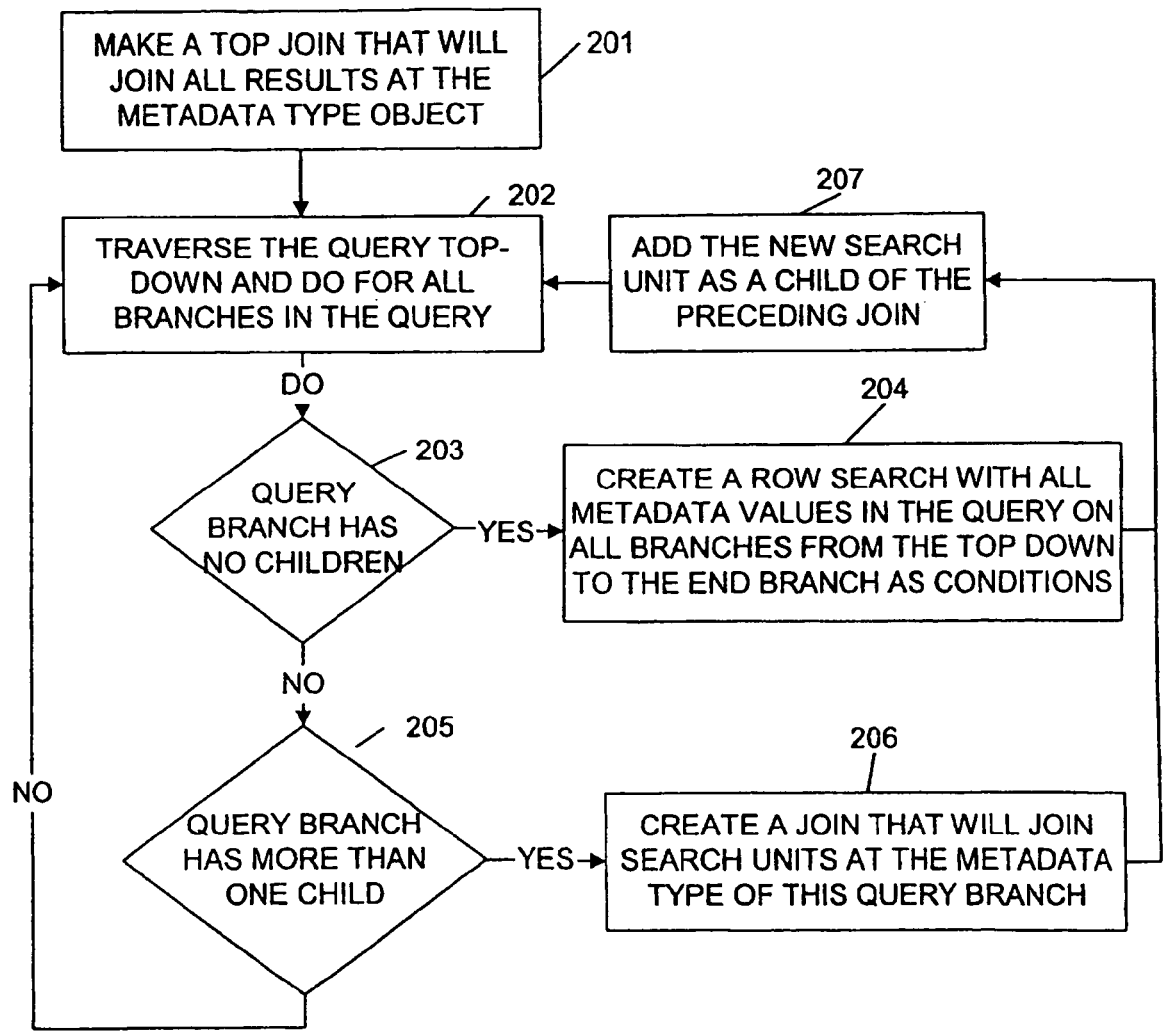
FIG. 2 is a diagram that in detail describes the step of creating a hierarchy of row searches and joins.

Given a query the present invention creates a search hierarchy (step 102). This process is described in detail in FIG. 2. The query has a number of branches. All the branches that describes a separate condition for the search and that are connected directly to the "query branch", are joined at metadata type o. A top join for that purpose is created (step 201). The query is traversed top-down and a branch is always processed before its children (step 202). For all the branches in the query the algorithm decides what to do depending on how many children the branch has. If the branch has no children (step 203) it is an end branch and a row search is created (step 204). The metadata values in the query on all branches from the root down to the end branch, becomes the conditions on metadata values in the row search. A condition may have complex values such as "or", "begins with" or "fuzzy". A row search is a number of conditions on metadata and finds all rows in the branch table that comply with all the conditions. If the number of children of a branch in the query is more than one (step 205), a join is created (step 206). The join is given the metadata type of the query branch. All other search units that will become its children in the search hierarchy are joined at that metadata type when the search units are performed. When a search unit has been created it is added as a child to the preceding join (step 207). The preceding join is the join created for the previous parent branch with more than one child, or the top join, if no such join has been created. If the number of children of a branch in the query is exactly one, nothing is done and the metadata value of the branch will be a condition in all end branches that lies under the branch. Hence a search hierarchy is very similar in structure to the query, with the exception that all branches with exact one child do not result in search units. Given the example query in Table 6 the search hierarchy in Table 7 is created.

TABLE 7

Resulting search hierarchy from the query described in Table 6

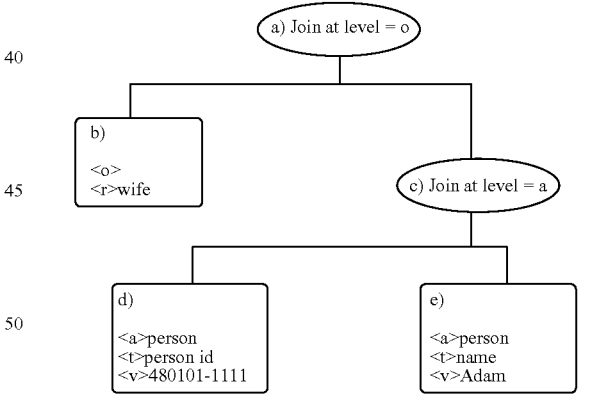

Figure 4:
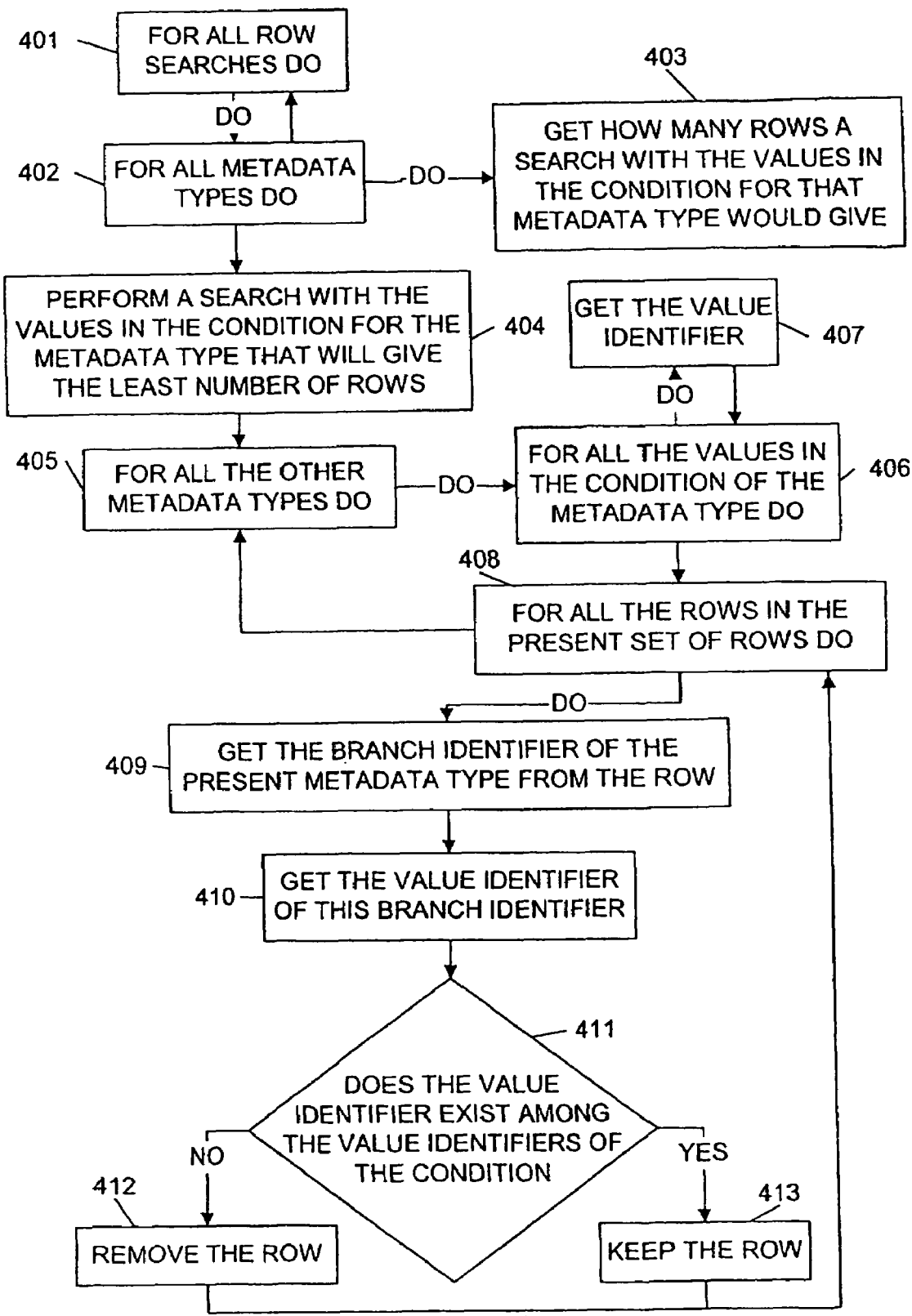
FIG. 4 is a diagram that in detail describes the step of performing the row searches.

When the search hierarchy has been created, all row searches will be performed (step 102). A row search is a search for rows in the branch table that comply with all conditions in the row search. This can be done in many ways depending on whether data is kept in primary or secondary memory. One possible method is described in detail in FIG. 4. All the row searches are done and result in a set of rows in the branch table (step 401). It might be just the row numbers but it might also be the entire rows and even the values of the branch identifiers in the rows, all depending on how much primary memory is available, the required speed of a search etc. All row searches have a number of conditions on metadata values. Each metadata type has a condition that contains any number of allowed values for that metadata type, and may be complex values such as "or", "begins with" or "fuzzy". A condition example is seen in Table 8:

<v>"Ohlson" OR "Ols"*

Table 8. Example condition. Allowed values for metadata type v are "Ohlson" or all values that begins with "Ols".

For all metadata types (step 402) the algorithm gets how many rows the allowed values for that metadata type would result in (step 403). This is done quickly since the indices of the present invention allow estimation of this in constant time even for more complex value conditions such as "begins with". When it is found out what metadata type will give the least number of rows, the search for the allowed values of that metadata type is performed (step 404). A search is performed by using the indices of the branch table. The indices of the chosen metadata type are used and the condition of that metadata type is the key used in the search. Hence, this part of the search is done similar to any relational database. The rest of the work to perform a row search is filtering of the first set of rows (steps 405-413). Only the rows that comply with the all the other conditions of the other metadata types are kept. Given the example branch table in Table 5 and the row searches b), d) and e) in Table 7, the resulting rows of those row searches are the rows in Table 9 below.

TABLE 9

Resulting rows for each row search as given in Table 7.

b)

| 0 [Adam] | 0 [wife] | — | 0 [person] | 0 [person id] | 0 [500101-2221] | d)

| 0 [Adam] | — | — | 1 [person] | 1 [person id] | 1 [480101-1111] | e)

| 0 [Adam] | — | — | 1 [person] | 2 [name] | 2 [Adam] |

Another possible way to perform a row search is of course to perform the searches for all metadata types and join the results regarding row number, but that will be less effective in most cases.

Figure 5:
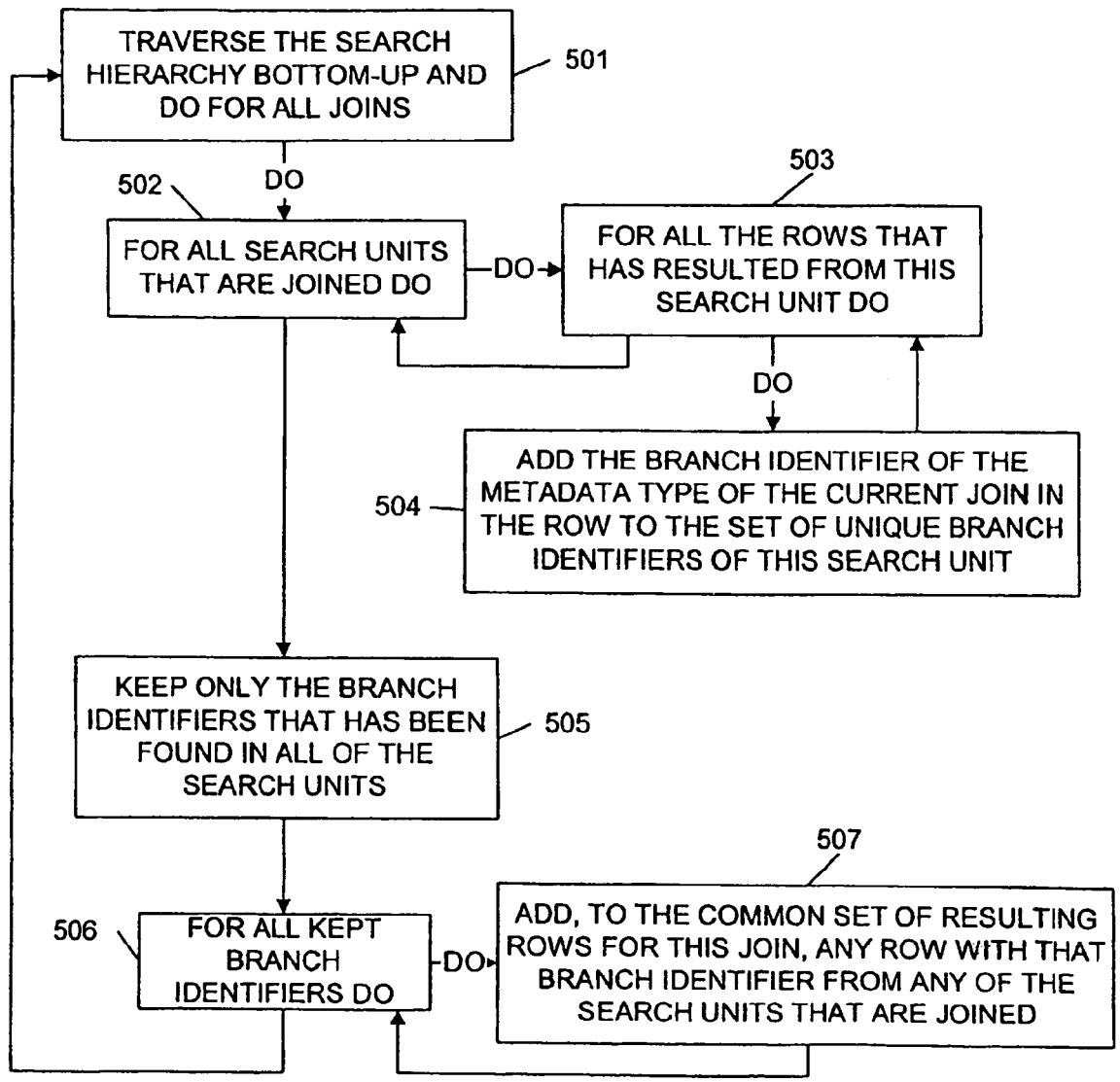
FIG. 5 is a diagram that in detail describes the step of performing successive joins in the hierarchy of row searches and joins.

When all row searches have been done, the resulting rows are joined successively until the top level of the search hierarchy is reached (step 104). This process is described in detail in FIG. 5. The joins in the search hierarchy are done bottom-up (step 501) and may include several search units that have already been done and resulted in a number of rows. For all those search units (step 502) the algorithm gets the unique branch identifiers of the metadata type of the current join, by looking in the rows at the branch identifier, of the metadata type of the current join (steps 503-504). Given the example of join c) in Table 7 which joins at metadata type a, and the resulting rows from row search d) and e) in Table 9, the unique branch identifiers of metadata type a, are {1} for the rows from row search d) and {1} for the rows from row search e). All the sets of unique branch identifiers from the different search units are joined, and only the unique branch identifiers that have been found in all of the search units are kept (step 505). In the example join, the common unique branch identifiers from both row search d) and e) are {1}. For all kept branch identifiers (step 506) any row from any of the joined search units with that branch identifier is kept as the result of the join (step 507). Only one row for each branch identifier, from the search units, needs to be kept since the search units all have the same branch identifiers for all levels above the level at which they were joined. In the example of join c) the resulting rows are shown in Table 10:

TABLE 10

Resulting rows after join c) as given in Table 8 of the rows from d) and e) in Table 9.

c)

| 0 [Adam] | — | — | 1 [person] | 2 [name] | 2 [Adam] |

Using the same method the rows from row search b) and the rows from join c) are joined by join a) and results in the rows in Table 11:

TABLE 11

Resulting rows after join a) as given in Table 7 of the rows from b) in Table 9 and the rows from c) in Table 10.

| 0 [Adam] | 0 [wife] | — | 0 [person] | 0 [person id] | 0 [500101-2221] |

In some cases it might be profitable to keep all the rows from all search units, but the resulting objects that are found will be the same.

The final step of the search is to calculate the resulting objects of the search by getting all unique branch identifiers of metadata type o from the resulting rows. The resulting rows in Table 11 have only branch identifier 0 for metadata type o, and the result of that search is the object with branch identifier 0.

Metadata Attributes

To each branch a number of metadata attributes can be attached. There can be restrictions as regards what attribute types are allowed to different metadata types. A more complete context free grammar to describe the object structure is described in Table 12. Table 13 shows an example of an object with attributes attached to some of the branches. A branch table for the object is shown in Table 14.

TABLE 12

Context free grammar of the object structure

| Object | → | <o OAttributes> Relations </o> |
| OAttributes | → | Classification Begin End Datestatus Timestamp Owner Accessrights |
| Relations | → | Keys \| <r RAttributes> String Keys </r> Relations |
| RAttributes | → | Classification Reversename Begin End Datestatus Timestamp Owner Accessrights |
| Keys | → | Attributes \| <k KAttributes> String Attributes </k> Keys |
| KAttributes | → | Begin End Datestatus Timestamp Owner Accessrights |
| Attributes | → | Types \| <a AAttributes> String Types </a> Attributes |
| AAttributes | → | Begin End Datestatus Timestamp Owner Accessrights |
| Types | → | Values \| <t TAttributes> String Values </t> Types |
| TAttributes | → | ε |
| Values | → | ε \| <v VAttributes> String </v> Values |
| VAttributes | → | Index Formattype Format Unit |
| Classification | → | c="String" |
| Reversename | → | r="String" |
| Begin | → | b="String" |
| End | → | e="String" |
| Datestatus | → | s="String" |
| Timestamp | → | m="String" |
| Owner | → | o="String" |
| Accessrights | → | a="String" |
| Index | → | i="String" |
| Formattype | → | t="String" |
| Format | → | f="String" |
| Unit | → | u="String" |
| String | → | ε \| Character String |
| Character | → | \u0001 \| ... \| \uFFFF |

TABLE 13

Simple example of objects with attributes.

```
<o classification="person">Adam Anderson
    <a>person
        <t>firstname
            <v t="text">Adam</v>
        </t>
        <t>lastname
            <v t="text">Anderson</v>
        </t>
    </a>
</o>
<o classification="person">Adam Simpson
    <a>person
        <t> firstname
            <v t="text">Adam</v>
        </t>
        <t>lastname
            <v e="2001-12-31" t="text">Anderson</v>
            <v b="2002-01-01" t="text">Simpson</v>
        </t>
    </a>
</o>
```

TABLE 14

The branch table created from the data in Table 13.

| O | r | k | a | t | v |
|---|---|---|---|---|---|
| 0 [Adam Anderson] | — | — | 0 [person] | 0 [firstname] | 0 [Adam] |
| 0 [Adam Anderson] | — | — | 0 [person] | 1 [lastname] | 1 [Anderson] |
| 1 [Adam Simpson] | — | — | 1 [person] | 2 [firstname] | 2 [Adam] |
| 1 [Adam Simpson] | — | — | 1 [person] | 3 [lastname] | 3 [Anderson] |
| 1 [Adam Simpson] | — | — | 1 [person] | 3 [lastname] | 4 [Simpson] |

The attributes to each branch can be stored and fetched from either primary memory or secondary memory or being stored in the inverted lists in the indices, all depending on whether higher speed or minimal use of primary memory is preferred. If the attributes are values where exact matches are of interest, they can be indexed just as metadata values.

Attribute Constraints in Queries

Queries can have constraint conditions on these attributes. An example of such a query described in xml is seen in Table 15:

TABLE 15

Example of query in xml format with search criteria on attributes.

```
<query end>="2002-01-01">
    <a>person
        <t>Anderson </t>
        <v t="text">Adam</v>
    </a>
</query>
```

Note that e>="2002-01-01" is not correct xml, but it is used for reasons of simplicity. The constraints on attributes in queries do not always have to be equality constraints. Different types of attributes can allow different types of constraint conditions. Attribute constraints can be both general for the query, such as e>="2002-01-01" in the example query, or specific for a certain metadata value, such as t="text" in the example query.

Searching with Attribute Constraints

Figure 3:
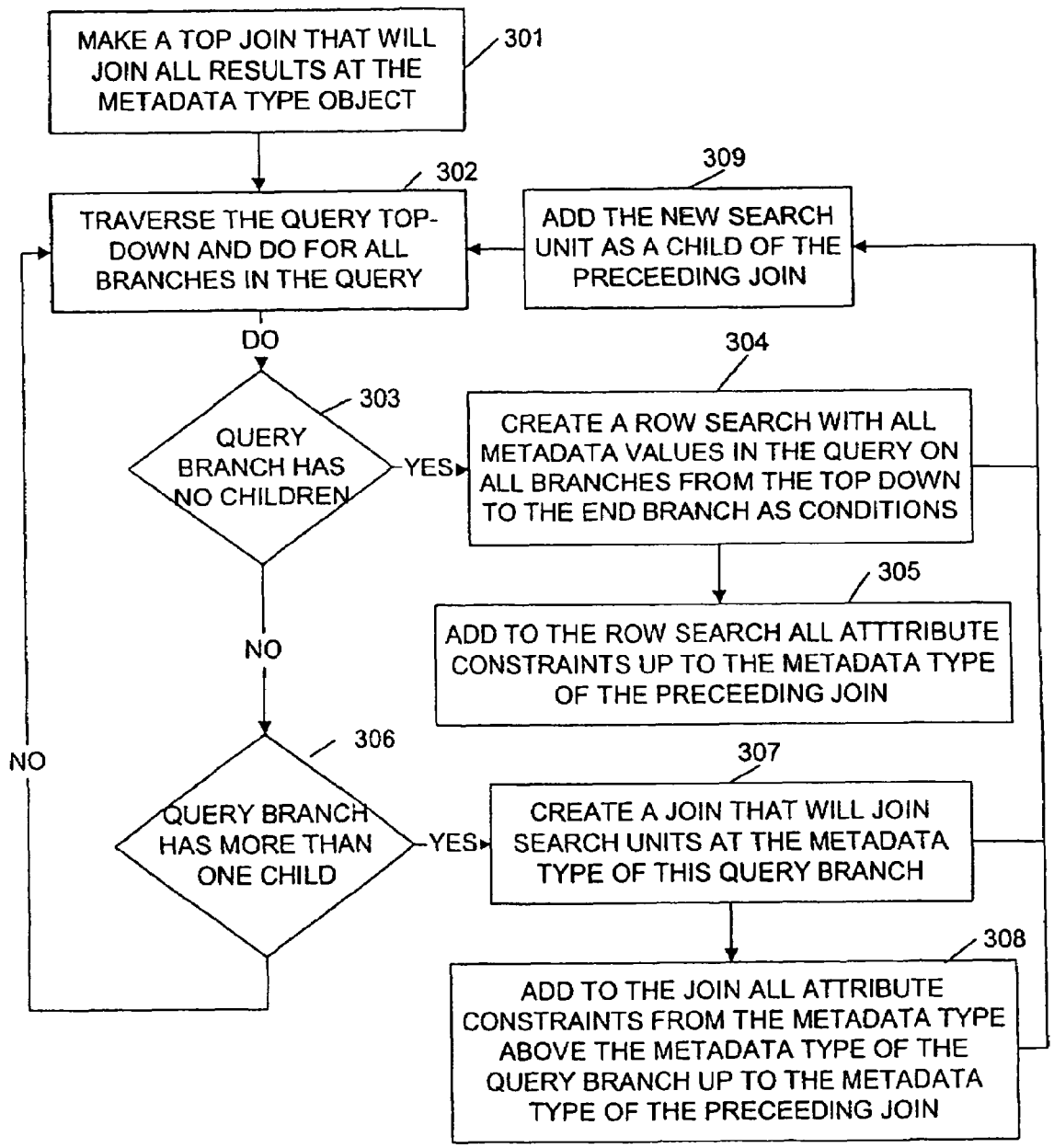
FIG. 3 is a diagram that in detail describes the step of creating a hierarchy of searches and joins with attribute constraints.

When using attribute constraints in the queries the search units created from the query need to have information on what attribute constraints there are on all the metadata types. Thus, the previous algorithm has to be amended (see FIG. 3). The structure of the search hierarchy and the conditions on metadata values are the same. To the row searches are added all attribute constraints, up to the metadata type of the preceding join (step 305). To the joins are added all attribute constraints, from the metadata type above the metadata type of the join, up to the metadata type of the preceding join (step 308). The example query in Table 14 results in the search hierarchy in Table 16:

TABLE 16

Resulting search hierarchy from the query described in Table 15

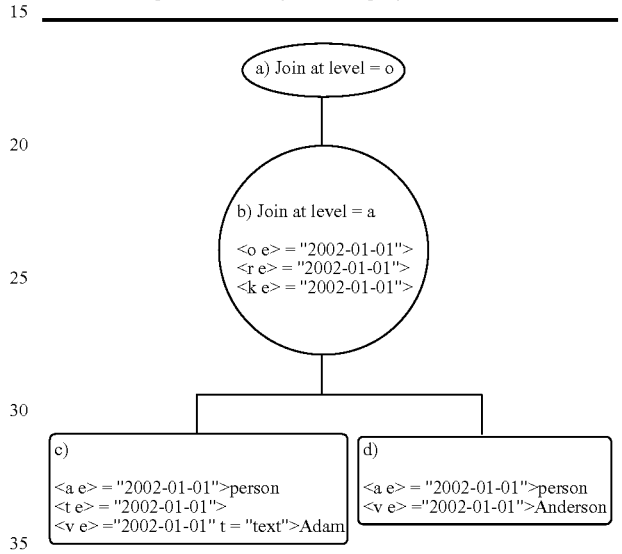

Even if there are no value conditions for a metadata type, there are cases when attribute constraints for that metadata type has to be considered. This depends on the different types of attributes and is not described in further detail here.

Figure 6:
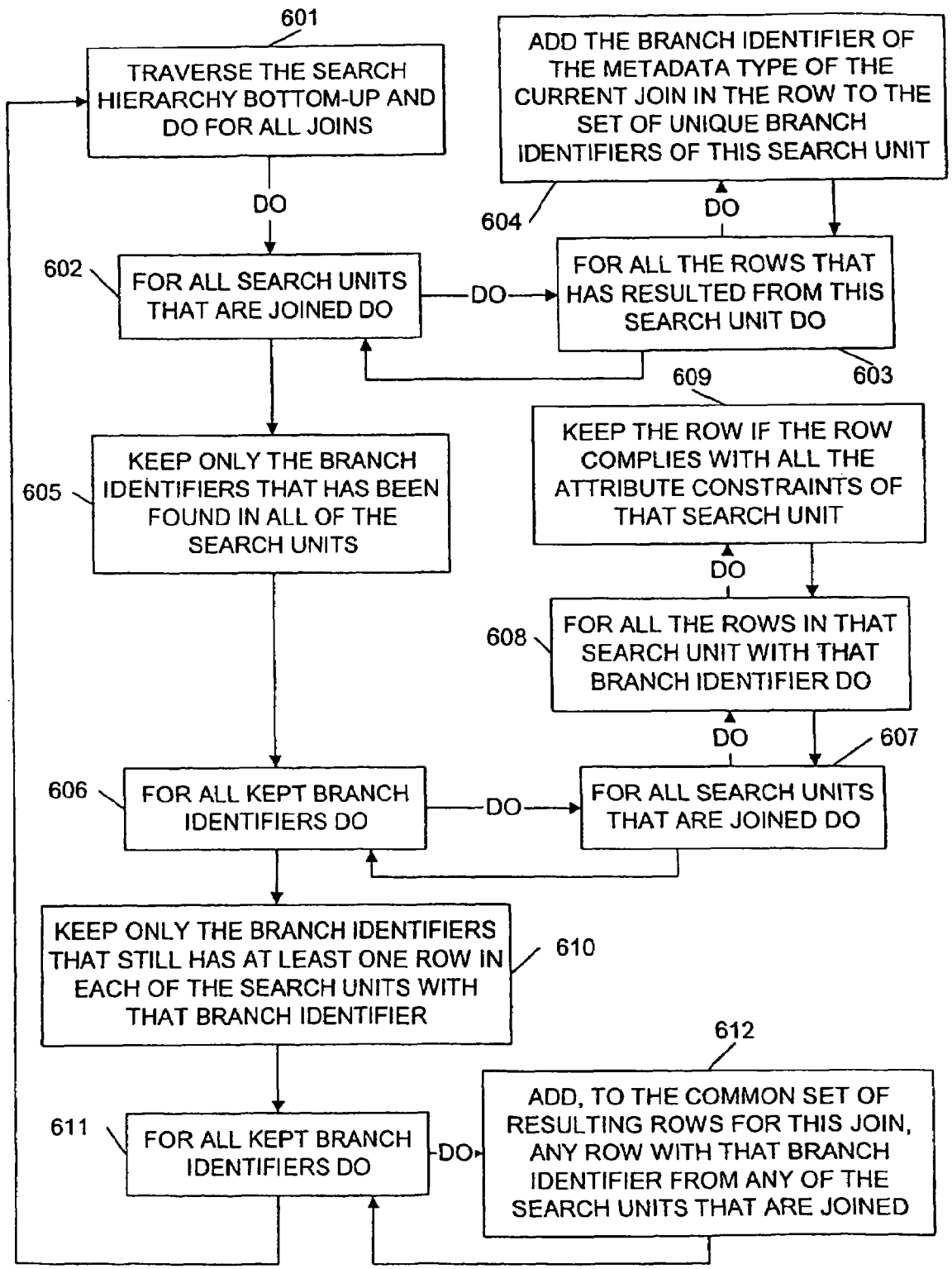
FIG. 6 is a diagram that in detail describes the step of performing successive joins in the hierarchy of row searches and joins with attribute constraints.

The row searches are performed as before. Since checking rows against attribute constraints usually is more time consuming than joining sets of rows, it is postponed until after the joins. The algorithm to perform successive joins until the top level is amended (see FIG. 6). In the amended algorithm all the resulting rows are filtered regarding attribute constraints (steps 606-610). As before the unique branch identifiers that are common for all the search units that are joined are found (steps 602-605). For all the kept branch identifiers (step 606), the algorithm finds for each search unit that are joined, the rows with that branch identifier (steps 607-608). Only the rows that comply with all of the attribute constraints of the search unit are kept (step 609). Only the unique branch identifiers that, after the attribute constraint filtering of rows, still has at least one row with that branch identifier in each of the search units that are joined are kept (step 610). The end of the join algorithm is as before. Only one row for each kept branch identifier is added to the result of the join (steps 611-612).

Given the example objects in Table 13 and its storage in the branch table in Table 14, a search with the query example in Table 15 gives the following result: The search hierarchy in Table 16 is created. All the row searches are performed and results in the rows in Table 17:

TABLE 17

Resulting rows for each row search as given in Table 16.

| 0 [Adam Anderson] | — | — | 0 [person] | 0 [firstname] | 0 [Adam] |
| 1 [Adam Simpson] | — | — | 1 [person] | 2 [firstname] | 2 [Adam] | d)

| 0 [Adam Anderson] | — | — | 0 [person] | 1 [lastname] | 1 [Anderson] |
| 1 [Adam Simpson] | — | — | 1 [person] | 3 [lastname] | 3 [Anderson] |

When join b) is performed, the common unique branch identifiers of metadata type a, for the rows from c) and d), are {0,1}. The algorithm revisits the rows from c) and d) with those branch identifiers and removes the rows that do not comply with the attribute constraints in c) and d). The remaining rows are found in Table 18:

TABLE 18

Remaining rows from c) and d) in Table 17 after filtering regarding attribute constraints.

c)

| 0 [Adam Anderson] | — | — | 0 [person] | 0 [firstname] | 0 [Adam] |
| 1 [Adam Simpson] | — | — | 1 [person] | 2 [firstname] | 2 [Adam] | d)

| 0 [Adam Anderson] | — | — | 0 [person] | 1 [lastname] | 1 [Anderson] |

The row from row search d) with the branch "<v>Anderson" was removed since that branch had the attribute e="2001-12-311" and the row search d) had the attribute constraint e>="2002-01-011" for metadata type v. After the filtering only the branch identifier 0 still has at least one row with that branch identifier at metadata type a in both c) and d). For that branch identifier one row from c) or d) is chosen as the result of join b) (see Table 19). The end result is the object with branch identifier 0.

TABLE 19

The resulting rows from join b) as given in Table 16 of the rows from c) and d).

| 0 [Adam Anderson] | — | — | 0 [person] | 1 [lastname] | 1 [Anderson] |

The join algorithm can be improved further if all the rows for each branch identifier are kept and the filtering regarding attribute constraints is postponed until the very last step when all joins have been made. The difference is that more information needs to be attached to each row that is kept, so when all joins have been made and the rows are being revisited, the algorithm knows what attribute constraints to apply to the rows and how to redo some of the joining. However the main idea is that filtering regarding attribute constraints is made after the joining of rows in the algorithm. This improves the speed of the searches since a join is fast while attribute values may not always be quick to access from memory and the number of rows after the join of rows is usually much less than the initial number of rows.

Relations

The structure of objects with the specified metadata types (o, r, k, a, t, v) makes it simple to define relations between objects. The branches underneath an r-branch are the metadata to search for in other objects. A relation may have no matches in other objects, it may have one match or it may have more than one match. A relation from an object is not a fixed "pointer", but a value reference or a search for other objects. Thus, a relation refers to all objects, which contain the same metadata as the relation branch, within a given "search space", typically a network. Hence the found objects of a relation can change as the search space changes over time. Consider the two objects "Adam" and "Eve" in Table 20 and Table 21:

TABLE 20

The object Eve

```
<o>Eve
    <a>person
        <t>person id
            <v>000108-2221
            </v>
        </t>
    </a>
</o>
```

TABLE 21

The object Adam with a relation "wife" to the object Eve in Table 20.

```
<o>Adam
    <a>person
        <t>person id
            <v>000106-1111
            </v>
        </t>
    </a>
    <r>wife
        <a>person
            <t>person id
                <v>000108-2221
                </v>
            </t>
        </a>
    </r>
</o>
```

Figure 10:
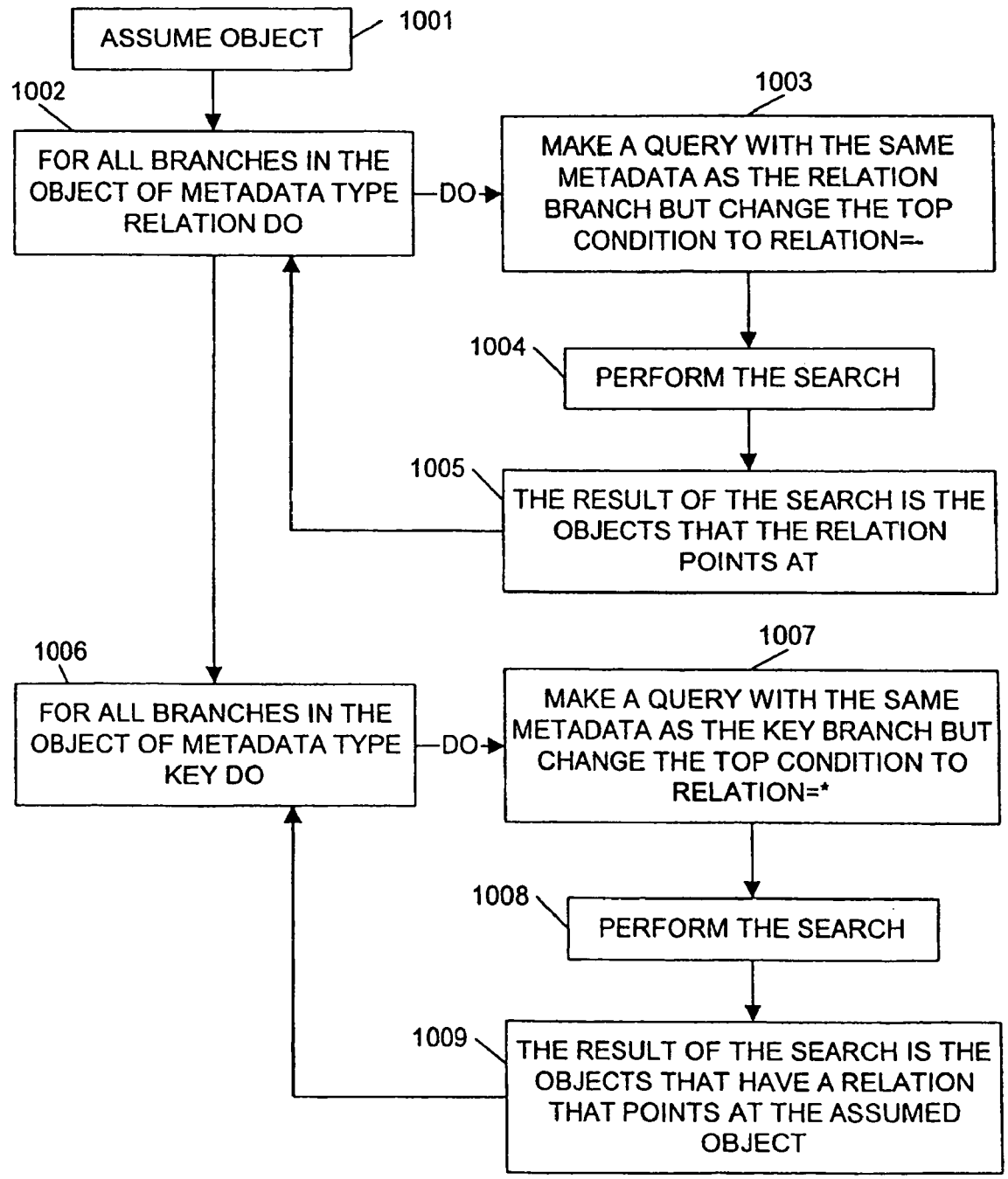
FIG. 10 is a diagram that illustrates an algorithm for finding other objects by using relations from and reverse relations to an individual object.

The object Adam has a relation wife to Eve. Under the r-branch "wife", Adam has metadata that identifies the object Eve. The algorithm to find other objects that a particular object has relations to is given in FIG. 10 (steps 1001, 1002-1005). Given an assumed object (step 1001), all its r-branches are transformed to queries (step 1003). The query has the same metadata as the relation branch, but the top condition is changed to <r>–, which determines that no value is allowed at that level. This condition prevents the query to find the assumed object and all other objects with similar relations. The query is performed (step 1004) and the result of the search is the objects that the relation points at (step 1005). The relation "wife" in Table 21 is transformed into the query in Table 22:

TABLE 22

The query created from the relation "wife" in Table 21.

```
<query>
    <r>-
        <a>person
            <t>person id
                <v>000108-2221
                </v>
            </t>
        </a>
    </r>
</query>
```

The result of this query is the object Eve.

Reverse Relations

It is useful to be able to know what other objects refer to a known object. This is possible in the present invention by using the metadata type k (key). A key declares some attributes in an object as unique or important identifiers of the object. In the object example Eve in Table 23 a key "person id key" declares the person id as an identifier of the object.

TABLE 23

The object Eve with a defined key "person id key"

```
<o>Eve
    <k>person id key
        <a>person
            <t>person id
                <v>000108-2221
                </v>
            </t>
        </a>
    </k>
</o>
```

Finding reverse relations is similar to finding relations. The algorithm to find other objects that a particular object has reverse relations to is given in FIG. 10 (steps 1001, 1006-1009). Given an assumed object (step 1001), all its k-branches are transformed to queries (step 1007). The query has the same metadata as the key branch, but the top condition is changed to <r>*, which determines that a value is required at that level. Only objects with a relation to those values are found. The query is performed (step 1008) and the result of the search is the objects that have a relation that points at the assumed object (step 1009).

These queries will only find objects that have relations to the values in the keys, but since keys are chosen to mark unique or important attributes in objects, it is very likely that most relations refer to the values in keys. To find the reverse relations from the object Eve in Table 23, the key "person id key" is transformed into the query in Table 24:

TABLE 24

The query created from the key "person id key" in Table 23.

```
<query>
    <r>*
        <a>person
            <t>person id
                <v>000108-2221
                </v>
            </t>
        </a>
    </r>
</query>
```

The example query finds the object Adam in Table 21 but not the object Eve in Table 23.

Associations

In the present invention it possible to define associations between objects. An association is a directed connection between two objects. An association map is a set of such associations. The association maps are used for several purposes: 1) to allow inheritance of metadata from objects. Metadata is inherited in the direction of the associations. An object inherits all metadata from the objects that has an association to it and also all metadata from objects that are indirectly associated to the object through several associations. This allows new ways to organize objects. For example, if a search or relation finds an object, all objects that inherit from that object are also found. 2) To store away relations between objects to give a faster way to browse between objects. Relations between objects are found by performing searches, which might sometimes not be fast enough. When a relation once has been found, an association between the same two objects can be created. This allows all relations to be pre-calculated and when a user wishes to browse between objects, it can be done without performing any time consuming searches. 3) To organize objects by a model. It is possible in the present invention to define models describing how different types of objects are related to each other. When a new object is inserted into the present invention, all relations to and from that object are found. For the relations that match a definition in a model, a corresponding association is created and the new object has automatically been organized.

Searching with Inheritance

When performing a search any set of association maps can be used for inheritance. The same search query can give different results depending on which association map that is used.

Figure 7:
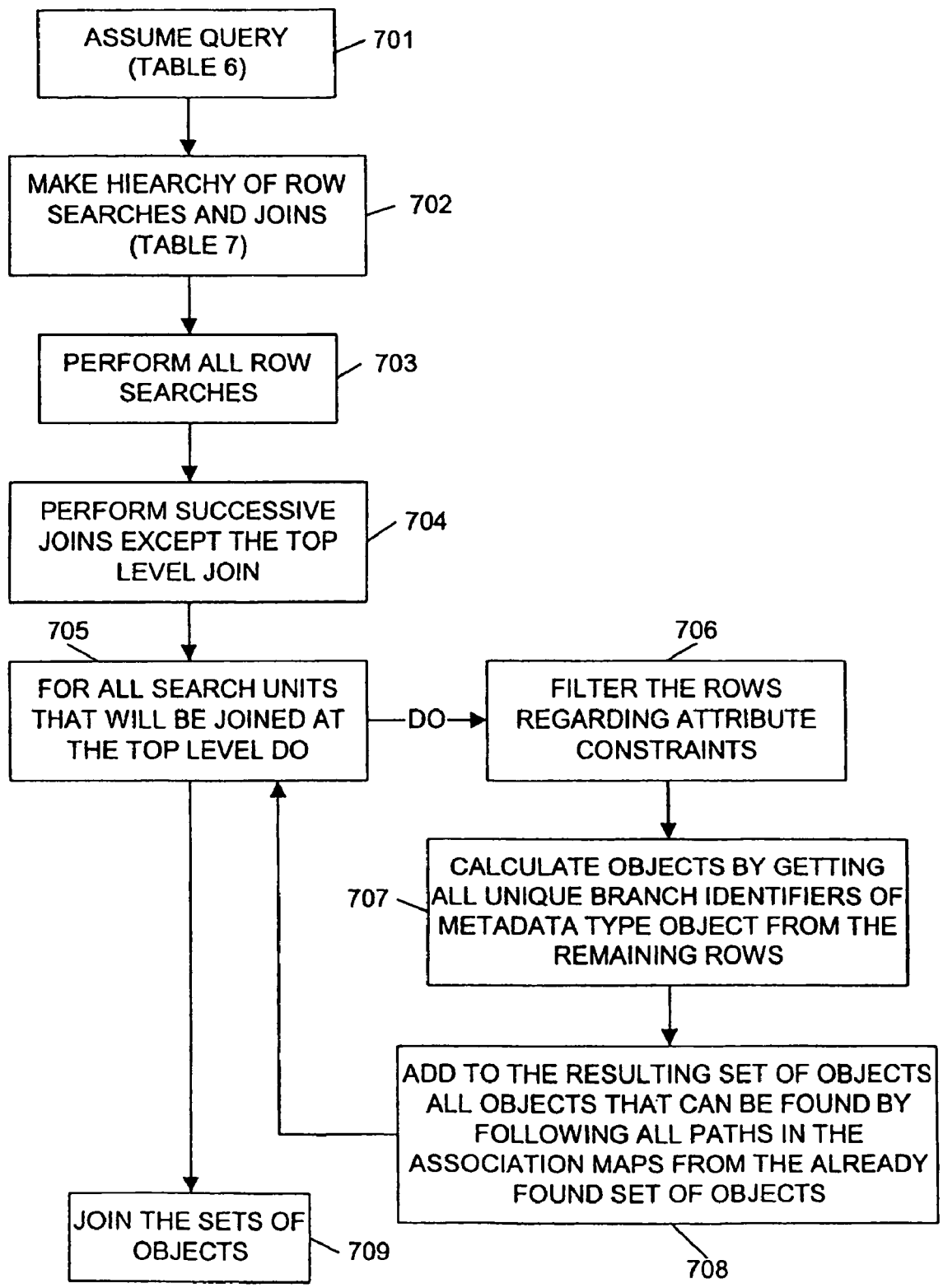
FIG. 7 is a diagram providing a general overview of the search algorithm with association maps or inheritance of metadata according to the invention.

When using inheritance of metadata the search algorithm in FIG. 1 is slightly changed. The new algorithm is described in FIG. 7. The top-level join is not performed along with the other joins in the search hierarchy (step 704). All the search units that are joined at the top level are handled separately (step 705). First the rows are filtered regarding attribute constraints (step 706) and the resulting objects are calculated (step 707). Then from the resulting set of objects, all inheriting objects are added to the resulting set of objects for that search unit (step 708). Inheriting objects are found by following all associations, in the set of association maps used for inheritance in the current search, from the current set of objects. The resulting sets of objects are then finally joined and the end result of the search is found (step 709).

Searching with inheritance may cause performance problems, since filtering regarding attribute constraints sometimes has to be done on large sets of rows even if the end result of objects is not very large, and should therefore be used with caution. But the possibility to find complex relations such as "which objects do both Adam and Eve have a relation to?" may sometimes be worth waiting for.

Searching Simplified

The storing and search procedure of the present invention have several great advantages over traditional searches in databases: 1) No initial knowledge of the structure of the data in the database is needed. All values for each metadata type can be searched for. 2) Queries with complex structures can be made. 3) Queries are simply matches with metadata in the database. No complex query language needs to be handled. 4) Searching is similar to free text searching on Internet. All values, regardless of where in the database it is, can be searched for in the same query. In a traditional database, the column where the search is performed has to be specified. 5) The search result is not just a number of rows in a database table. It is one or more complete objects that besides the data proper, also contains relations to other objects.

This way of putting all data in the whole database into one single table is possible since a few allowed metadata types in a specified order (o,r,k,a,t,v) has been chosen, and all data has to be described in this format. Since the number of metadata types is known, a table can be created with the same columns in the same order as the metadata types. The complex tree like structure of an object is retained in the branch table by repeating branches for each time its children occurs in a row. With these methods internal data storage, indexing and searching are made possible.

Why the Proposed Generalized Search Gives Good Performance

In a traditional relational database searching is quicker since not all values lies in the same column. The drawback in performance of the present invention is only that the branch table is bigger than the tables in a traditional database.

In the present invention, all the columns in the branch table are indexed. Since each row search choose to perform searches in the indices only for the condition that will give the least number of rows, and the rest of the conditions are checked on that set of rows, the minimum number of rows to fetch from indices are chosen.

Joins of search units are no different in complexity than joins between tables in a traditional database. A join always has to match all rows from one set of rows to all rows in another set of rows. Note that in the present invention a user does not have to specify how this join is going to be made.

Implementation

Figure 8:
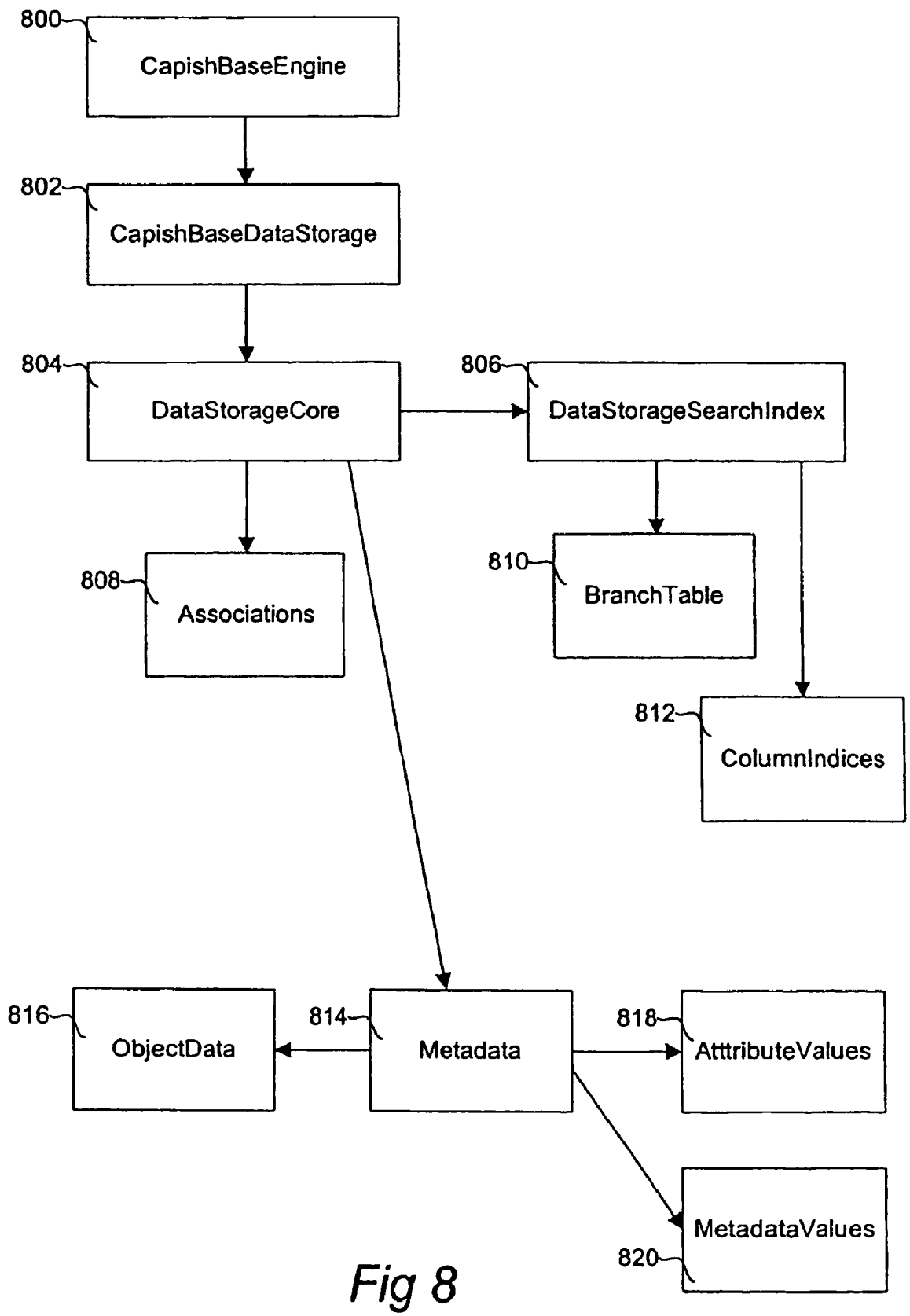
FIG. 8 is a diagram providing a general overview of the system model of the present invention.

A practical implementation of the current invention has been done by programming in the object-oriented programming languages Java and C#. A modular illustration of the realization of the current invention is given in FIG. 8. In FIG. 8, a CapishBaseEngine module 800 serves as an entry point for user logon, search queries, data modification, etc. A CapishBaseDataStorage module 802 handles all queries, data modification, etc., as well as translating these to the appropriate internal format. A DataStorageCore module 804 serves to handle queries, data modification, etc., on a lower level and also to make sure that changes will be consistent throughout the system. It also controls an Associations module 808 which manages the associations in the system.

Indexing and searching is performed by a DataStorageSearchIndex module 806. To this end, it cooperates with a BranchTable module 810 and a ColumnIndices module 812, where the former handles the branch table and the latter contains the indices to the columns of the branch table.

Both the DataStorageCore module 804 and the DataStorageSearchIndex module 806 cooperate with a Metadata module 814, which contains all metadata and values, and makes them accessible and searchable. To this end, the Metadata module 814 uses an AttributeValues module 818 and a MetadataValues module 820, which contain all attribute values and metadata values, respectively, that belong to the branches stored in the branch table.

Distributed Network Architecture

Figure 9:
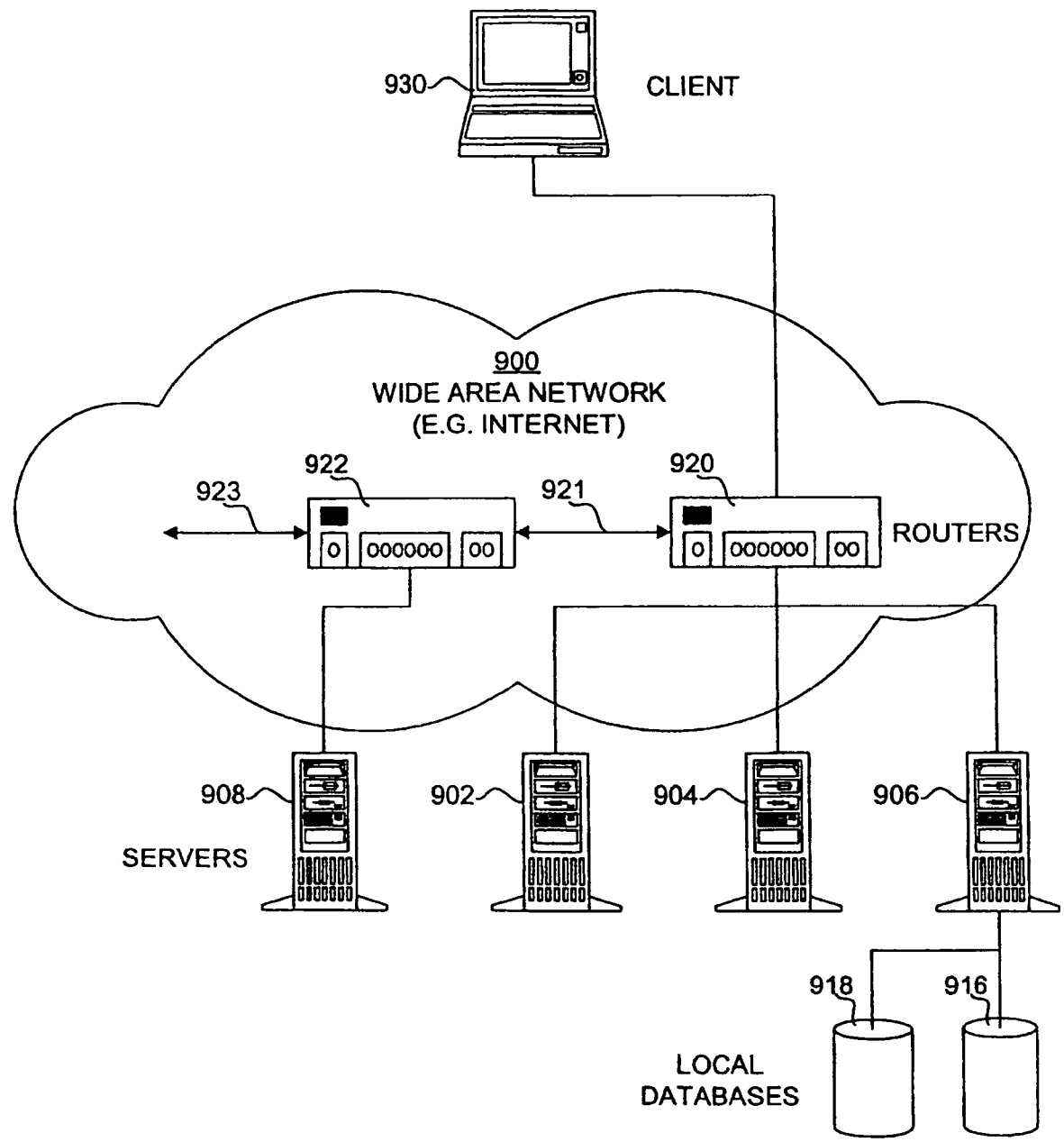
FIG. 9 is a diagram providing a general overview of a distributed architecture in which the present invention may be applied.

Answers to questions often require accessing information from multiple independent data sources. The current invention allows for integration of data from different sources over any distributed network, since all related objects are found by executing specific relation queries over the network. One possible network solution for the current invention is shown in FIG. 9. A client 930 is connected to a router 920 over a wide area network 900 such as the Internet. The router 920 is connected to any number of other routers 922, as indicated at 921 and 923. The routers 920, 922 may be connected to different servers 902, 904, 906, 908. Each server has any number of local databases 916, 918. A user on the client 930 can from an existing network choose any number of local databases to work with. Each query or other operation submitted by the client 930 to the router 920 is distributed through the network 900 to the chosen set of local databases 916, 918 via their associated server 906. The answers from the local databases 916, 918 are returned and joined to a common result in the servers and the routers, and ultimately presented to the user on the client 930.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A computer program product having program code which program code is stored on a computer-readable storage medium and which, when executed on a processor is adapted to provide a database of information objects and a database engine for managing said information objects, wherein each information object comprises metadata for describing the information object and for defining a hierarchical structure of branches which constitutes said information object and which includes relations to other information objects, wherein an individual branch has:
a metadata type, which is selected from a predetermined and limited set of n different metadata types, said predetermined and limited set being independent of content in or type of the information object, and which metadata type represents one respective hierarchical level in said hierarchical structure;
a metadata value; and
an arbitrary number of other branches, of any hierarchical level strictly subordinate to the hierarchical level of said individual branch, connected to said individual branch as children thereof, said arbitrary number including zero branches;

wherein said database comprises a branch table having a fixed structure of columns that correspond to the n different metadata types and each information object is stored in said database in the form of an n-field data structure is stored as a row in said branch table, said fixed structure being independent of content in or type of the information object; and a query function for searching said database, wherein said query function is adapted to:
accept a search query which is specified in a declarative language in accordance with said hierarchical structure of information objects in said database and which thus defines a branch hierarchy to search for;
search said database so as to find information objects, if any, which contain a branch hierarchy that makes the one specified in said declarative language; and further adapted to comprise the steps of:
a) receiving a search query;
b) transforming the search query into a search hierarchy of row searches and joins, said joins occurring within said branch table, by:
b1) generating a top join for joining all results at a metadata type object;
b2) traversing the branches of the search query top-down by
b'1) if a particular branch has no children, creating a row search with the metadata values of all branches from the root down to the particular branch as conditions on metadata values in the row search;
b'2) if a particular branch has more than one child, creating a join for joining row searches and joins at the metadata type of the particular branch;
b'3) adding a row search created in step b'1) or a join created in step b'2), respectively, as a child of a preceding join;
c) performing all the row searches from step b) so as to result in a set of rows in said branch table;
d) performing the joins in a search hierarchy successfully starting from the bottom of the search hierarchy and ending with the top of the search hierarchy; and e) producing a result of the search query by retrieving all unique information objects from the outcome of step d).

2. A computer program product as in claim 1, wherein each information object is stored in said database in the form of an n-field data structure for each particular branch that does not have any children, and wherein each field of the n-field data structure represents a respective branch that precedes said particular branch as its ancestor.

3. A computer program product as in claim 1, wherein said declarative language is xml.

4. A computer program product as in any preceding claim 1 or 2, wherein said metadata includes metadata attributes to respective branches of an information object.

5. A computer program product as in claim 4, wherein said query function is adapted to accept search queries with constraint conditions on said metadata attributes.

6. A computer program product as in claim 5, wherein said metadata attributes include timestamps on individual branches of an information object.

7. A computer program product as in claim 5, wherein said metadata attributes include access rights to individual branches of an information object.

8. A computer program product as in claim 5, wherein said metadata attributes include unit definitions for individual branches of an information object.

9. A computer program product as in claim 1, wherein a branch of a predetermined first metadata type in an individual information object defines a relation from said individual information object to another information object and wherein said query function is adapted to search said database to find said another information object by matching the metadata thereof with the metadata included in said branch of a predetermined first metadata type value in said individual information object.

10. A computer program product as in claim 9, wherein a branch of a predetermined second metadata type, other than said first metadata type, in an individual information object allows another information object to define a reverse relation to said individual information object, in the form of a branch of said predetermined first metadata type in said another information object, and wherein said query function is adapted to find said another information object by matching the metadata included in said branch of a predetermined second metadata type in said individual information object with the metadata included in said branch of a predetermined first metadata type in said another information object.

11. A computer program product as in claim 10, wherein n=6 and said set of metadata types consists of {Object, Relation, Key, Attribute, Type, and Value}, metadata type Object representing the root level of said hierarchical structure.

12. A method of searching a database of information objects as provided by the computer program product according to claims 1 or 2, wherein the steps of specifying, through a man-machine interface of a computer, a search query in a declarative language in accordance with said hierarchical structure of information objects in said database;

submitting said search query to said database engine through said computer; receiving a result of said search query at said computer; and presenting said result through said man-machine interface.

13. A method of connecting objects in a database of information objects as provided by the computer program product according to claims 1 or 2, wherein the steps, for an assumed individual information object, of for all branches in the assumed information object that are of a first predetermined metadata type, said first predetermined metadata type allowing a relation to be defined from the assumed information object to another information object:

forming a query based on the metadata of the branch, searching the database with the query, and collecting, as a result of the searching step, all information objects, if any, that the assumed information object has a relation to; and for all branches in the assumed information object that are of a second predetermined metadata type, other than said first predetermined metadata type, said second predetermined metadata type allowing a reverse relation to be defined from another information object to the assumed information object:

forming a query based on the metadata of the branch, searching the database with the query, and collecting, as a result of the searching step, all information objects, if any, that have a relation to the assumed information object.

14. A computer program product having program code, which program code is stored on a computer-readable storage medium and which, when executed on a processor is adapted to provide a database of information objects and a database engine for managing said information objects, wherein each information object comprises metadata for describing the information object and for defining a hierarchical structure of branches which constitutes said information object and which includes relations to other information objects, wherein an individual branch has:

a metadata type, which is selected from a predetermined and limited set of n different metadata types, said predetermined and limited set being independent of content in or type of the information object, and which metadata type represents one respective hierarchical level in said hierarchical structure;

a metadata value; and an arbitrary number of other branches, of any hierarchical level strictly subordinate to the hierarchical level of said individual branch, connected to said individual branch as children thereof, said arbitrary number including zero branches, wherein the computer program product is further adapted to a branch table having a fixed structure of columns that correspond to the n different metadata types and each information object is stored in said database in the form of an n-field data structure is stored as a row in said branch table, said fixed structure being independent of content in, or type of the information object:

a) receiving a search query;

b) transforming the search query into a search hierarchy of row searches and joins by b1) generating a top join for joining all results at a metadata type object;

b2) traversing the branches of the search query top down by b'1) if a particular branch has no children, creating a row search with the metadata values of all branches from the root down to the particular branch as conditions on metadata values in the row search;

b'2) if a particular branch has more than one child, creating a join for joining row searches and joins at the metadata type of the particular branch;

b'3) adding a row search created in step b'1) or a join created in step b'2), respectively, as a child of a preceding join;
c) performing all the row searches from step b) so as to result in a set of rows in a branch table;
d) performing the joins in the search hierarchy successively starting from the bottom of the search hierarchy and ending with the top of the search hierarchy; and
e) producing a result of the search query by retrieving all unique information objects from the outcome of step d).

15. A computer program product having program code, which program code is stored on a computer-readable storage medium and which, when executed on a processor is adapted to provide a database of information objects and a database engine for managing said information objects, wherein
  each information object comprises metadata for describing the information object and for defining a hierarchical structure of branches which constitutes said information object and which includes relations to other information objects,
  wherein an individual branch has:
  a metadata type, which is selected from a predetermined and limited set of n different metadata types, said predetermined and limited set being independent of content in or type of the information object, and which metadata type represents one respective hierarchical level in said hierarchical structure;
  a metadata value; and
  an arbitrary number of other branches, of any hierarchical level strictly subordinate to the hierarchical level of said individual branch, connected to said individual branch as children thereof, said arbitrary number including zero branches,
  wherein the computer program product is further adapted to a branch table having a fixed structure of columns that correspond to the n different metadata types and each information object is stored in said database in the form of an n-field data structure is stored as a row in said branch table, said fixed structure being independent of content in, or type of the information object:
    a) receiving a search query;
    b) transforming the search query into a search hierarchy of row searches and joins by
      b1) generating a top join for joining all results at a metadata type object;
      b2) traversing the branches of the search query top down by performing row searches;
    c) performing all the row searches from step b) so as to result in a set of rows in a branch table;
    d) performing the joins in the search hierarchy successively starting from the bottom of the search hierarchy and ending with the top of the search hierarchy; and
    e) producing a result of the search query by retrieving all unique information objects from the outcome of step d).

16. A computer program product as in claim 15, wherein said row searches comprises at least, if a particular branch has no children, creating a row search with the metadata values of all branches from the root down to the particular branch as conditions on metadata values in the row search.

17. A computer program product having program code, which program code is stored on a computer-readable storage medium and which, when executed on a processor is adapted to provide a database of information objects and a database engine for managing said information objects, wherein
  each information object comprises metadata for describing the information object and for defining a hierarchical structure of branches which constitutes said information object and which includes relations to other information objects,
  wherein an individual branch has:
  a metadata type, which is selected from a predetermined and limited set of n different metadata types, said predetermined and limited set being independent of content in or type of the information object, and which metadata type represents one respective hierarchical level in said hierarchical structure;
  a metadata value; and
  an arbitrary number of other branches, of any hierarchical level strictly subordinate to the hierarchical level of said individual branch, connected to said individual branch as children thereof, said arbitrary number including zero branches,
  wherein the computer program product is further adapted to a branch table having a fixed structure of columns that correspond to the n different metadata types and each information object is stored in said database in the form of an n-field data structure is stored as a row in said branch table, said fixed structure being independent of content in, or type of the information object:
    a) receiving a search query;
    b) transforming the search query into a search hierarchy of searches and joins by
      b1) generating a top join for joining all results at a metadata type object;
      b2) traversing the branches of the search query top down by performing searches, wherein said searches comprises, if a particular branch has no children, creating a search with the metadata values of all branches from the root down to the particular branch as conditions on metadata values of information objects in branches of the search;
    c) performing all the searches from step b);
    d) performing the joins in the search hierarchy successively starting from the bottom of the search hierarchy and ending with the top of the search hierarchy; and
    e) producing a result of the search query by retrieving all unique information objects from the outcome of step d).

* * * * *